July 9, 1963  W. Y. TALBOT ETAL  3,096,788
ROTARY VALVE
Filed Aug. 21, 1961  3 Sheets-Sheet 1
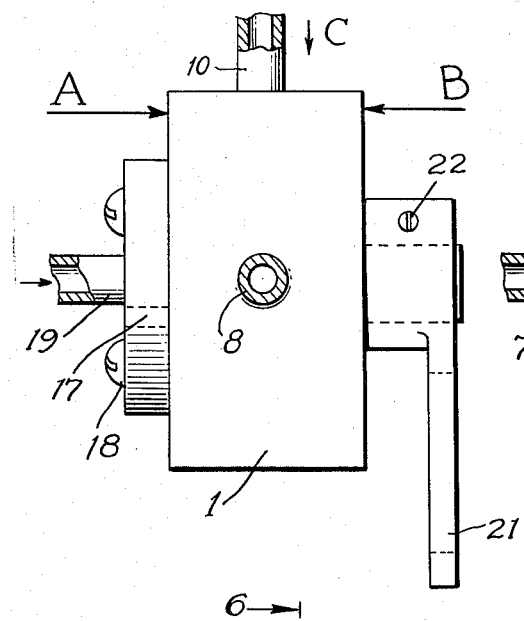
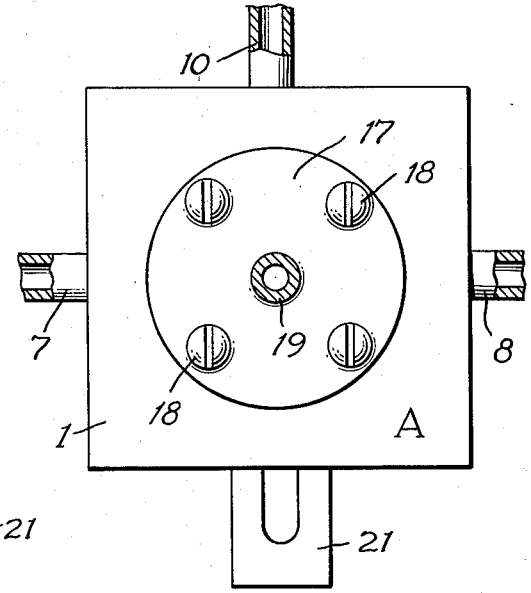
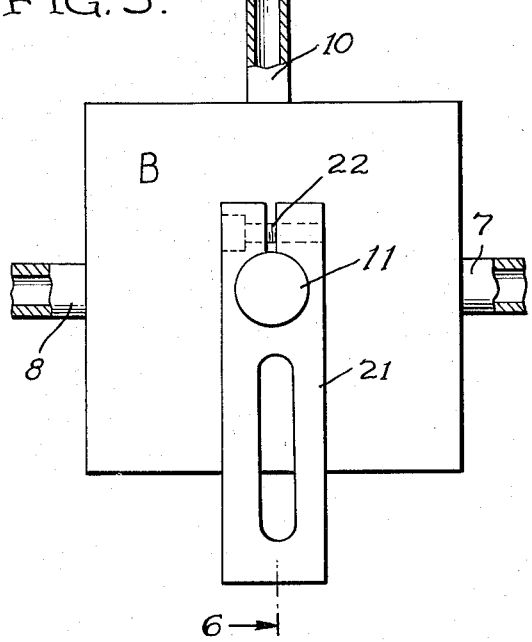
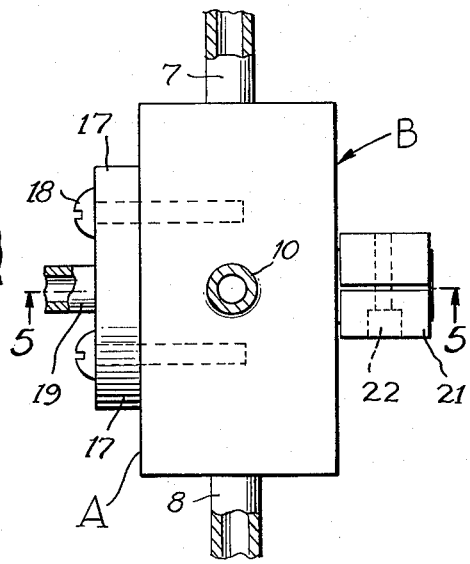
INVENTORS
William Y. Talbot
Jessie Chess

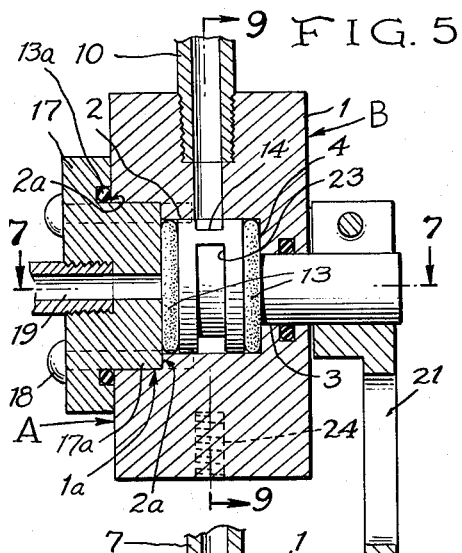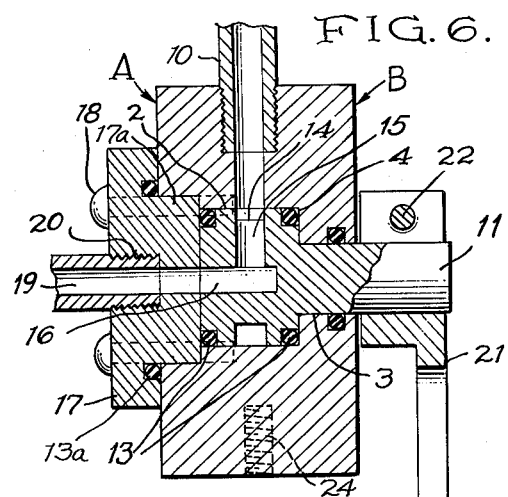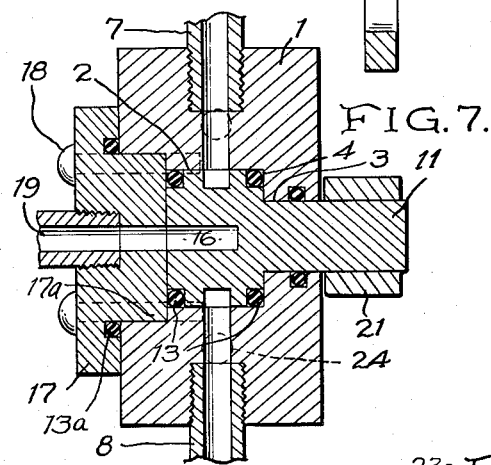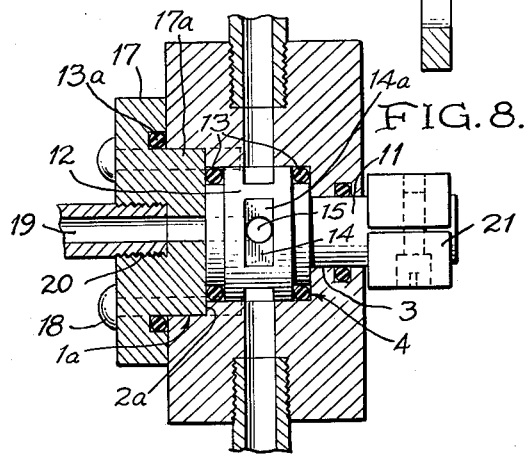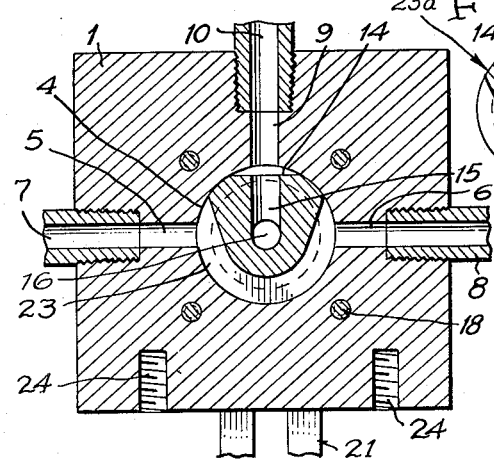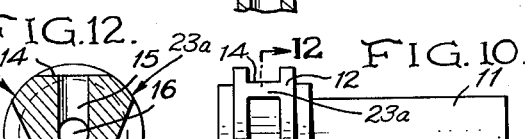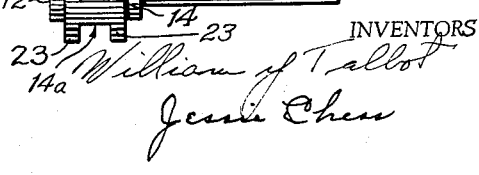

July 9, 1963  W. Y. TALBOT ETAL  3,096,788
ROTARY VALVE
Filed Aug. 21, 1961  3 Sheets-Sheet 3

INVENTORS
William Y. Talbot
Jessie Chess

United States Patent Office 3,096,788
Patented July 9, 1963

3,096,788
ROTARY VALVE
William Y. Talbot, Box 13225, Phoenix, Ariz., and Jessie Chess, 412 Constitution Ave. SE., Washington, D.C.
Filed Aug. 21, 1961, Ser. No. 132,821
1 Claim. (Cl. 137—625.11)

This invention relates to an improvement in valves and more particularly a three-way valve.

A primary object of the invention is to provide a valve of the character mentioned which is of the rotary hydraulic type capable of extraordinary close control and hence adapted for use in various industries where high pressures are essential.

A further object of the invention resides in providing a valve which is simple in operation; has proper seals to withstand high pressures, for example, in the range of 10,000 pounds per square inch, and in some cases higher, and adequately constructed to prevent leakage in all pressure ranges below that pressure.

In addition, certain critical factors exist for successful operation, for example, the relation of metal parts to each other; their capacity to resist fluid leakage; and the maintenance of relative ratio of fluid passages in the housing and valve body for all sizes of valves.

A still further object of the invention resides in providing a valve which requires only minimum maintenance; can be repaired by unskilled labor; and is also reliably efficient and useful in operation.

With the above and other objects in view, the invention consists of the novel features of construction, combination and arrangement of parts as will be hereinafter referred to and more particularly pointed out in the specification and claims.

In the accompanying drawings, forming a part of this application,

FIGURE 1 is a side elevation of a valve constructed in accordance with the invention, with parts shown in section;

FIGURE 2 is a front elevation of the same, with parts shown in section;

FIGURE 3 is a rear elevation;

FIGURE 4 is a top plan view;

FIGURE 5 is a vertical section, taken on the line 5—5, of FIGURE 4, looking in the direction of the arrows;

FIGURE 6 is a vertical section, taken on the line 6—6, of FIGURE 3, this section being similar to the FIGURE 5, except that the shaft and valve in this view are shown in section;

FIGURE 7 is a horizontal sectional view, taken on the line 7—7, of FIGURE 5;

FIGURE 8 is a view similar to FIGURE 7, with the control shaft and valve shown in full lines;

FIGURE 9 is a section as seen on the line 9—9, of FIGURE 5, looking in the direction of the arrows;

FIGURE 10 is a side elevation of the control shaft carrying the valve;

FIGURE 11 is a top plan view thereof, and

FIGURE 12 is a vertical transverse section through the valve head, taken on the line 12—12, of FIGURE 10, looking in the direction of the arrows;

Similar references designate corresponding parts throughout the several views.

Figure 13:
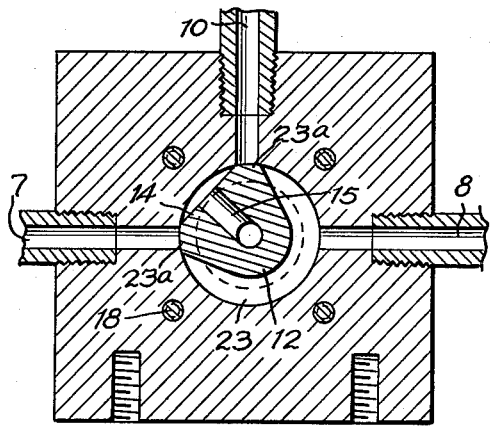
FIGURES 13–16 are diagrammatic views showing the position of the valve throughout a complete cycle of operation.

The numeral 1 designates a block or housing formed preferably of metal including a rear face A and a front face B, and having a valve cavity extending from the rear face A to the front face B thereof, said cavity including a first bore $1^a$, a second bore 2, and a third bore 3. The last two bores are of reduced diameter with respect to the first bore and each other, and extend from the rear face A to the front face B. This arrangement provides spaced internal shoulders $2^a$ and 4 transverse to the common axis of the several bores. The intermediate or second bore 2 is adapted to receive a valve head and the third bore 3 receives a valve head control shaft, to constitute a valve assembly more particularly hereinafter set forth.

Leading from the bore 2 laterally from diametrically opposite sides thereof are the first and second outlet passages 5 and 6 as shown in FIGURE 9. These passages are threaded adjacent their outer ends to receive the respective outlet pipes 7 and 8. Leading upwardly from the bore 4 is a third outlet passage 9 extending to the top of the block or housing 1, the outer end of the latter passage being threaded to receive the threaded end of the outlet pipe 10. Thus the block or housing is provided with a three-way outlet for fluids passing therethrough.

Control of fluids through block 1 is acquired through the medium of a valve assembly which may be generally referred to by the letter V. This valve comprises a control stem 11 and a head 12 formed integral therewith, the control shaft being of a diameter to fit the smallest bore 3 and the head being of a diameter to fit within the intermediate bore 2, said head forming specifically the valve for direct control of the fluids through the outlets.

The valve head 12 is substantially cylindrical in general design, and reduced in diameter at the front and rear ends thereof to provide seat or shoulders which receive and assist in the compression of the seals 13, the rear face of the head 12 being adapted to abut the shoulder 4 within the bore. The periphery of the head 12 is provided with a flat face 14 as the chord of an arc, to form a recess $14^a$. Leading inwardly from this recess toward the axial center of the shaft or head is a bore 15 which communicates with an axial cavity 16 formed in the head 12 from the outer end thereof. This cavity 16 communicates with the radial bore 15 and terminates in the peripheral recess $14^a$, thereby constituting the inlet means for fluids to be controlled in passing through the block or housing 1.

The valve body comprising the head 12 and the shaft 11 are inserted from the front end of the block 1 through the bore 2 until the rear face of the head abuts the shoulder 4.

In order to retain the valve in place, a thrust plate 17 having a peripheral flange portion overlying face A and a plug portion of reduced diameter $17^a$ is provided. This form of plate enables the use of a sealing O ring $13^a$ in addition to the O rings 13 at opposite sides of the valve head 12 and insures fluid-tightness under all high pressure conditions. These rings are all clamped firmly between the plug portion $17^a$ of the sealing or thrust plate in a manner to compress them to withstand the high pressure under which the valve is intended to operate. This plate is held to the front face of the block 1 by the securing screws 18. A fluid pipe 19 is threaded into a mating opening 20 formed centrally of the sealing or thrust plate 17 and this pipe 19 registers at all times with the axial bore 16 of the valve head.

The valve body and its control shaft are held in place by the thrust plate and there is engaged with the outer end of the stem 11, a lever 21, the latter being securely held tightly about the shaft by means of the set-screw 22. This lever is used to actuate the control shaft which in turn actuates the valve, and is shown by way of example since any means may be used for connection with the lever to remotely actuate the same.

As clearly shown in FIGS. 5, 9, 10, and 12, the valve head is provided at its opposite edges with spaced annular walls 23 which continuously engage the inner side of the valve chamber. At the point where the chord 14 occurs, the space between the side walls 23 is closed by the transverse walls 23ª, thus completely forming the recess 14ª. The stem 11 of the valve assembly passes through the third bore 3 to receive the operating handle 21.

From the construction shown and hereabove described, it will be seen that fluids from the inlet pipe 19 may be readily controlled to pass through the valve head to any one of the three outlets 7, 8 or 10. If desired, any one of these outlets may be plugged so as to provide a two-way, instead of a three-way, valve. By adjusting the control shaft 11 so that the recess 14ª registers with one of the outlets 5, 6, or 9, fluids may be permitted to pass to any one of the outlet pipes. The amount of fluids passing therethrough may be controlled by adjustment of the valve head with respect to the outlet openings and the construction of the valve and parts is such that same will effectively withstand low or high pressures. Likewise, the valve may be controlled readily so that no great effort is required to actuate the same, regardless of the character of fluid passing therethrough or the pressure which may be used.

The block or housing 1 carrying the valve and the inlet and outlet pipes may be supported on a machine or device in any suitable means desired. For conveniently mounting said block in position, the same is provided with threaded openings 24 in the lower face thereof, which may be utilized as desired.

In this valve there are several very critical relations: (a) the bore in the housing block cannot be over one-half of one thousandth of an inch more than the rotor or leakage to the return side of the valve will result; (b) the seals seats must be cut five to twenty thousandths of an inch less than the clearing distance or again leakage will be prevalent; (c) the flat face on the feeding side of the rotor must be exactly one-thousandth of an inch for each 14.583-thousandths of an inch of the rotor diameter. If it is greater the valve will feed two outlets at one time. If it is less the valve loses its sensitivity. All other dimensions can be altered except the above ratios or the valve loses its intended efficiency.

In FIGURES 11 and 12 the flat surface 14 is at the ratio of 1 to 14.583 of the total rotor diameter at its largest point. A tolerance of zero and not to exceed one-half thousandth of an inch (.005) must be maintained in the fit of parts named rotor and body.

EXAMPLE 1

In the case of a ¼" valve, the rotor bore 15 can be extended to twice its diameter, thus doubling its capacity.

EXAMPLE 2

Also using a one-quarter inch valve as an example, the rotor valve formula will apply in the following way—the rotor diameter may be increased to one and one-half inches; the relief cut 14ª will deepen to three-eighths of an inch; the small end of the rotor is .750"; and the flat face is .120".

The Operation of the Valve

In FIGURES 13, 14, 15 and 16, the reference 16 indicates the inlet side of the valve from the pressure pump. Pipe 8 is the relief or the return to the hydraulic supply reservoir.

In FIGURE 13 the valve is in the off position.

Figure 14:
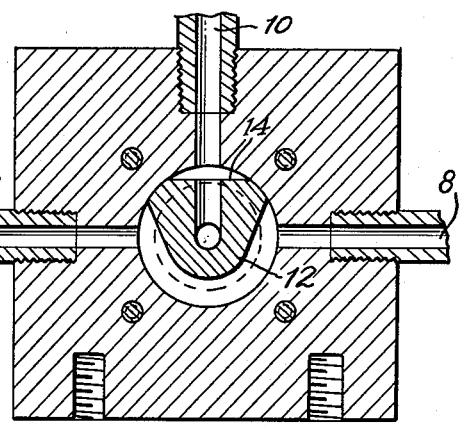

In FIGURE 14 the hydraulic pressure is coming into the passage 16 out pipe 10 to the device operated. Return oil is coming in through pipe 7 which is in communication with pipe 8 which is the return to the reservoir.

Figure 15:
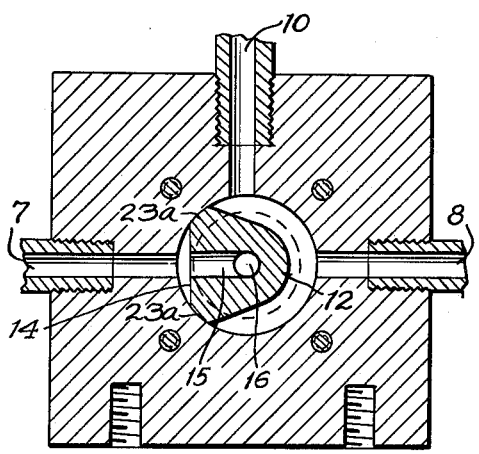

In FIGURE 15, inlet 16 is feeding out of pipe 7 to the machine to be operated and the return oil is coming in pipe 10 which is now in communication with pipe 8 which returns the fluid to the reservoir, thus reversing the flow of fluid between FIGURE 14 and 15.

Figure 16:
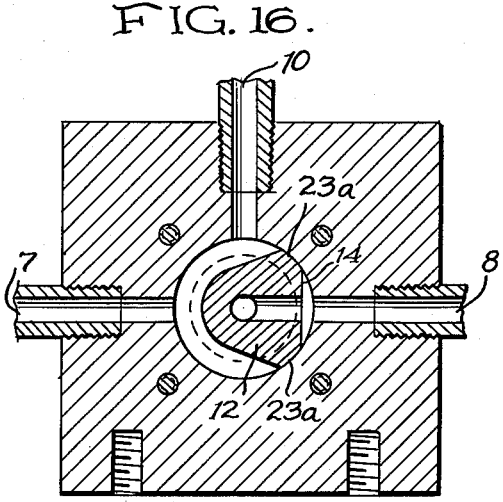

In FIGURE 16, with the inlet receiving oil under pressure, the valve is bypassing all fluid directly back to the reservoir through pipe 8.

While the foregoing particularly describes the elements best adapted to perform the functions set forth, it is apparent that various changes in form, proportion and in the minor details of construction may be resorted to, without departing from the spirit or sacrificing any of the principles of the invention.

We claim:

A fluid-tight hydraulic valve adapted for pressures in the neighborhood of 10,000 lbs., comprising, a housing having a cavity including first, second, and third bores of reduced diameter progressively from the rear face toward the front face respectively to provide a sealing plug chamber, a valve head chamber, and a valve stem chamber, said housing having first, second, and third fluid passages disposed radially at 90° to each other and communicating with said valve head chamber, shoulders respectively formed at the junctions between the first bore and the second bore and also between the latter and the third bore, a valve assembly including:

an annular valve head and a control stem disposed respectively in the valve head chamber and the valve stem chamber, said valve head having an axial cavity and a radial bore for selectively establishing communication between said fluid passages, said valve head also having a face which is a chord of the related arcuate portion of said head, said radial bore intersecting said face, spaced annular walls extending continuously around the side edges of said head to sealingly engage the inner side of the valve head chamber, transverse walls disposed between said annular walls at the opposite ends of said face, seals at the outer sides of the annular walls, a combined sealing and thrust plate including an attaching flange and a plug in said sealing plug chamber, one of said seals nested in the included angle between the outer sides of said walls and the plug, said flange also having a seal on its inner face, all of said seals being compressed when said flange is secured to the rear face of the housing by force applied in the direction of the axis of the plug.

References Cited in the file of this patent
UNITED STATES PATENTS

| | | |
|---|---|---|
| 2,127,679 | Dudley | Aug. 23, 1938 |
| 2,414,966 | Melichar | Jan. 28, 1947 |
| 2,590,888 | Randol | Apr. 1, 1952 |